Aug. 14, 1973   E. FRISCH ET AL   3,752,737
COMBINATION OF NUCLEAR REACTOR AND MISSILE SHIELD
Filed July 8, 1970   3 Sheets-Sheet 1

WITNESSES
Alfred G. Colaizzi
James L. Young

INVENTORS
Erling Frisch
Harry N. Andrews

ATTORNEY

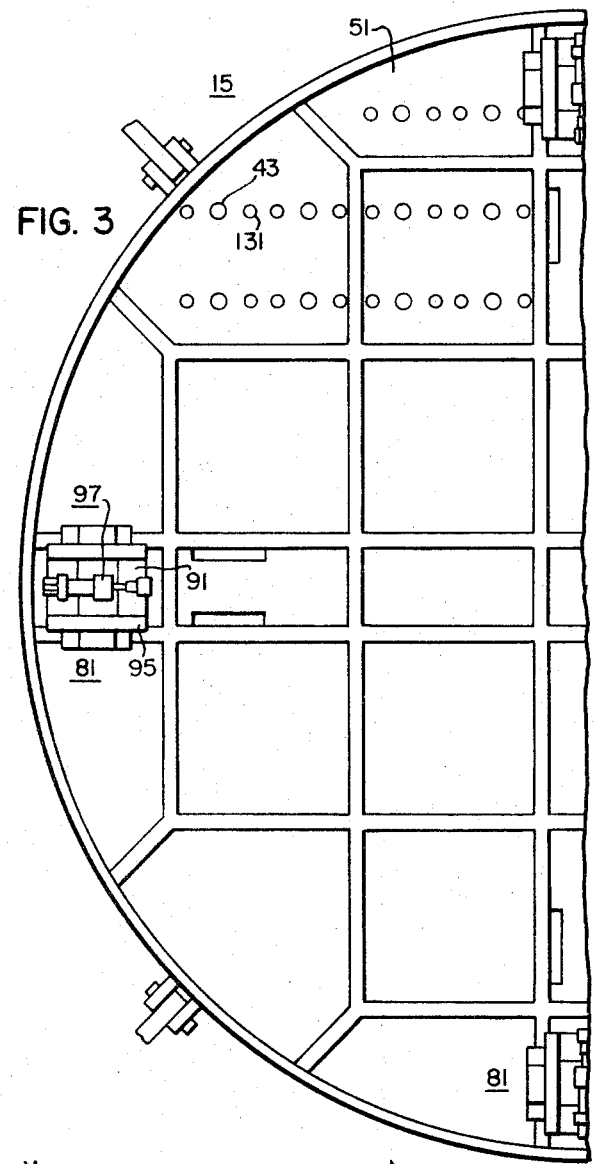
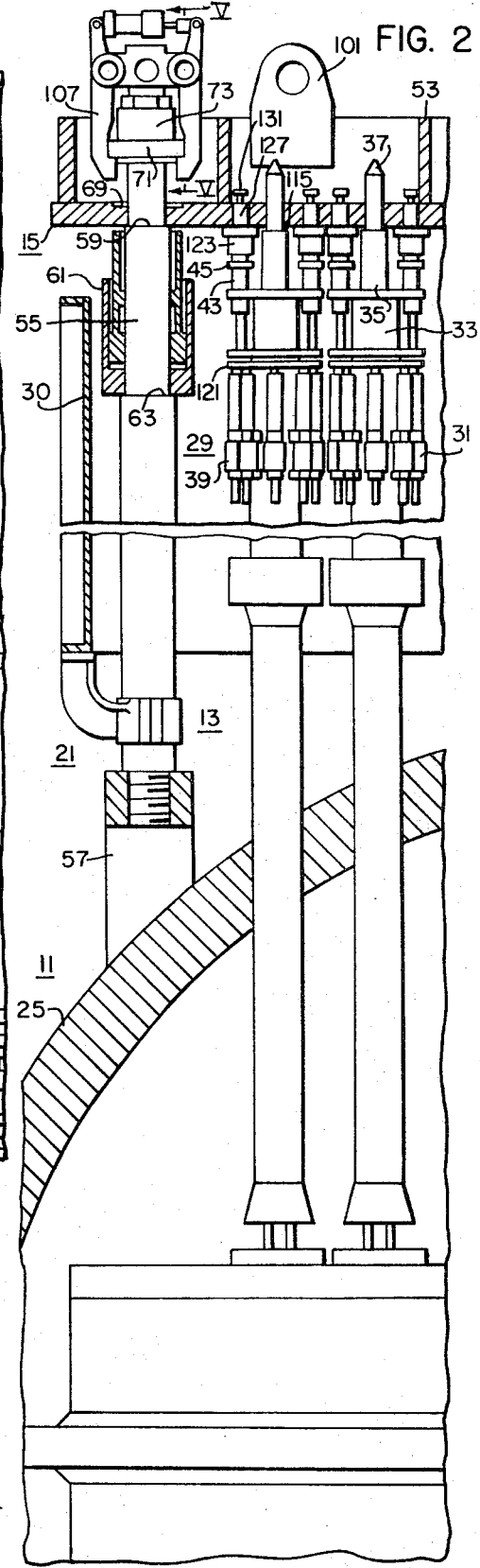
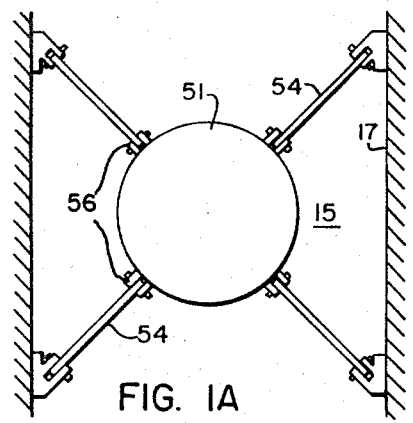

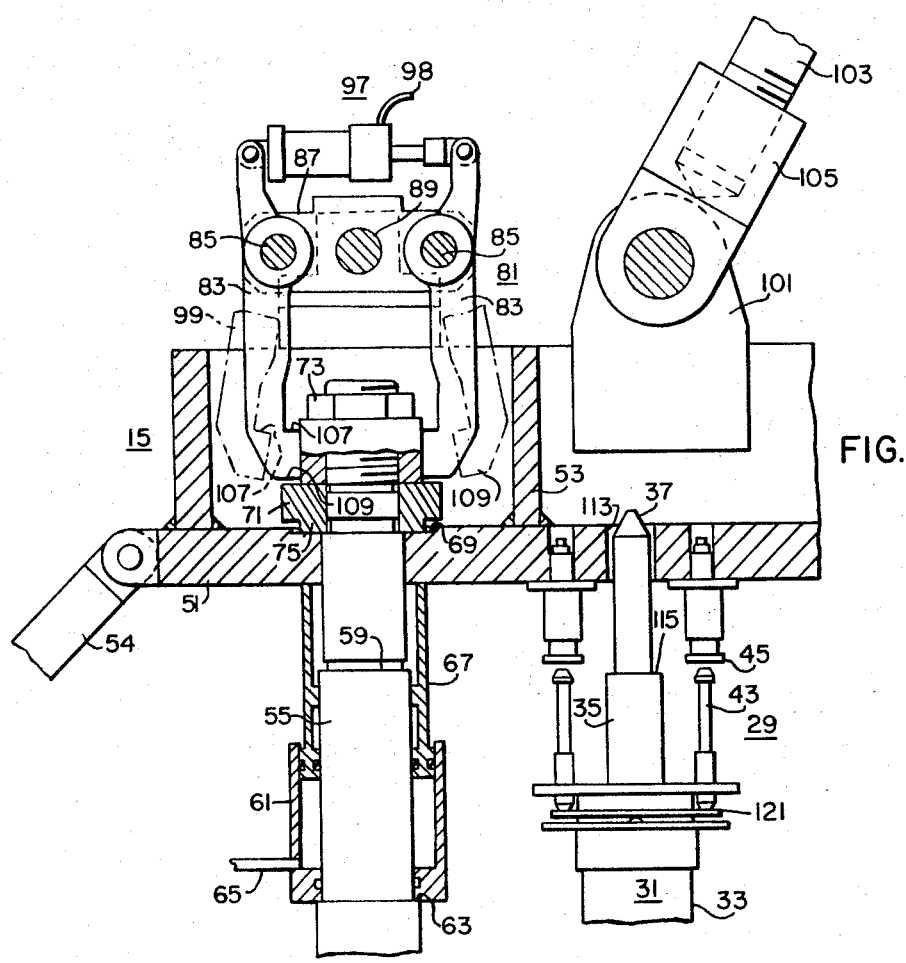
FIG. 4
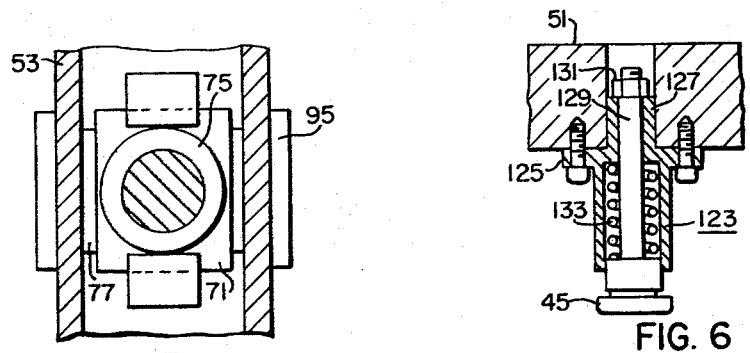
FIG. 7
FIG. 6

United States Patent Office 3,752,737
Patented Aug. 14, 1973

3,752,737
COMBINATION OF NUCLEAR REACTOR AND
MISSILE SHIELD
Erling Frisch, Pittsburgh, and Harry N. Andrews, Export, Pa., assignors to Westinghouse Electric Corporation, Pittsburgh, Pa.
Filed July 8, 1970, Ser. No. 53,200
Int. Cl. G21c 9/00
U.S. Cl. 176—38
11 Claims

ABSTRACT OF THE DISCLOSURE

There is disclosed the combination of a nuclear reactor with a missile shield which also affords protection in the event of a seismic disturbance. The shield is massive plate of steel or the like with ribs and is mounted above, and connected to, the upper package of the reactor. The plate has holes through which projections from the housings of the retracting mechanism clusters for the control rods pass. In the event of a seismic disturbance the movement of the mechanism clusters is limited by the restraint exerted by the shield plate on the projections. In addition the shield is retractable from the upper package by operation of hydraulic pistons and when retracted locks the rod retracting mechanisms for a refueling operation.

CROSS REFERENCE TO RELATED APPLICATIONS

This application relates to the following applications concurrently filed herewith:

Ser. No. 53,207 entitled "Means for Rapidly Exposing the Core of a Nuclear Reactor for Refueling" by Erling Frisch and Harry N. Andrews.

Ser. No. 53,203 entitled "Cable Support Structure for Enabling a Nuclear Reactor To Be Refueled Rapidly" by Erling Frisch and Harry N. Andrews.

Ser. No. 53,201 entitled "Rapidly Refuelable Nuclear Reactor" by Erling Frisch and Harry N. Andrews.

Ser. No. 53,199 entitled "Means for Retaining and Handling Reactor O-Ring Seals" by Erling Frisch.

Ser. No. 53,198 entitled "Hydraulic Head Closure Mechanism" by Erling Frisch and Harry N. Andrews.

Ser. No. 53,202 entitled "Rapidly Refuelable Nuclear Reactor" by Harry N. Andrews and Richard S. Orr.

To the extent that the understanding of the invention disclosed herein may be enhanced by reference to any of the referenced applications, these applications are incorporated herein by reference.

BACKGROUND OF THE INVENTION

This invention relates to the nuclear reactor art and has particular relationship to the facilities with which such reactors are combined to meet safety requirements and regulations. For the purpose of facilitating the explanation of this invention it will be assumed that a reactor is mounted vertically in a pit with a lower package, including the fuel core, the lower part of the vessel below its closure head and mounting facilities, or lower internals, in this lower part of the vessel, and an upper package including the closure head above the core, the upper internals, the tensioning devices for the bolts holding the parts of the reactor together, control rod retracting mechanisms to which the control rods are attached, and the surrounding cable support structure.

Safety regulations for nuclear reactor installations, particularly of the pressurized water type, prescribe that the reactors be provided with a missile shield directly above the reactor for the purpose of intercepting a control rod mechanism or part thereof, should a major break occur, and thus preventing the mechanism from penetrating the dome of the vapor container. The shield also prevents ejection from the reactor of the associated control rods. Provisions also must be made to prevent damage to the mechanisms during a seismic disturbance.

In accordance with the teachings of the prior art, the missile shield is a heavy steel and concrete plate mounted above, but not directly connected with the reactor structure. Seismic protection is afforded by an additional heavy structural steel ring, attached to the closure head of the reactor vessel and closely encircling the upper portion of the mechanism cluster. This ring is secured laterally by anchor rods to the walls of the chamber in which the reactor vessel is located, commonly referred to as the reactor pit.

The rapid refueling concept, as disclosed in the previously mentioned concurrently filed applications and particularly in Ser. No. 53,202, requires that all control rods be withdrawn from the core and stored in the upper internals and in the mechanism housings when the upper package, consisting of the upper internals, the closure head, bolt tensioning devices and control rod mechanisms, is being removed during refueling. It is important that the rod holding devices do not fail during this period and it is, of course, of even greater importance that the rods are completely free to scram during normal operating conditions. To meet these conflicting requirements, the control rod mechanisms are provided with changeable holding magnets as disclosed in previously mentioned concurrently filed application Ser. No. 53,201. This necessitates that a device be provided above the mechanisms which, by vertical positioning, simultaneously transforms all holding magnets from normal operating condition to refueling condition or vice versa.

It is an object of this invention to provide a combination of a nuclear reactor and missile shield which shall include a unitary or an integrated missile shield structure that shall not only meet all prescribed safety regulations and requirements but shall also serve during refueling to control the holding means for the control rod mechanism.

SUMMARY OF THE INVENTION

In accordance with this invention there is provided the combination of a nuclear reactor and missile shield whose shield is a heavy reinforced plate of steel or other like material. The shield is mounted removably above the reactor structure between a lower position assumed during normal operation of the reactor, and an upper position to which it is moved during refueling. The combination includes latching means for locking the shield in each position and the shield is prevented from lateral movement by anchor rods extending between the walls of the reactor pit and the shield when the shield is secured in the lower position during normal operation. The latching means prevents accidental shifting of the shield either in the lower or the upper position. The intentional movement of the shield vertically from one position to the other is effected hydraulically by pistons movable in cylinders. The pistons and cylinders are supported on columns or rods secured to the head of the pressure vessel of the reactor.

The shield has openings through which projections extend from the control rod mechanism housing of the reactor. Lateral movement of the mechanisms during seismic disturbance is suppressed by engagement of these projections with the walls of the shield openings. The shield is connected to the control rod mechanisms as disclosed in the previously mentioned application Ser. No. 53,201 so that when it is moved to the upper position the magnetizable cores of holding electromagnets for the control rods is replaced by permanent magnet holding means.

BRIEF DESCRIPTION OF THE DRAWINGS

For a more detailed description of this invention, both as to its organization and as to its method of operation, together with additional objects and advantages thereof, reference is made to the following description, taken in connection with the accompanying drawings, in which:

FIG. 1A is a plan view showing the lateral support of the missile shield of the apparatus shown in FIG. 1;

FIG. 2 is a view partly in section and partly in side elevation showing a part of the shield and of the cooperative upper package of a reactor of the combination shown in FIG. 1, with the shield in the lower position;

FIG. 3 is a plan view showing a part of the shield of the combination shown in FIG. 1;

FIG. 4 is a fragmental view partly in section and partly in side elevation showing a part of the shield and a part of the upper package of the reactor of the combination shown in FIG. 1, with shield in the raised position;

FIG. 6 is a sectional view in elevation of an actuator used to contact control mechanism push rods during the reactor refueling operation; and FIG. 7 is a view in section taken along line VII—VII of FIG. 5.

DESCRIPTION OF THE PREFERRED EMBODIMENTS

Figure 1:
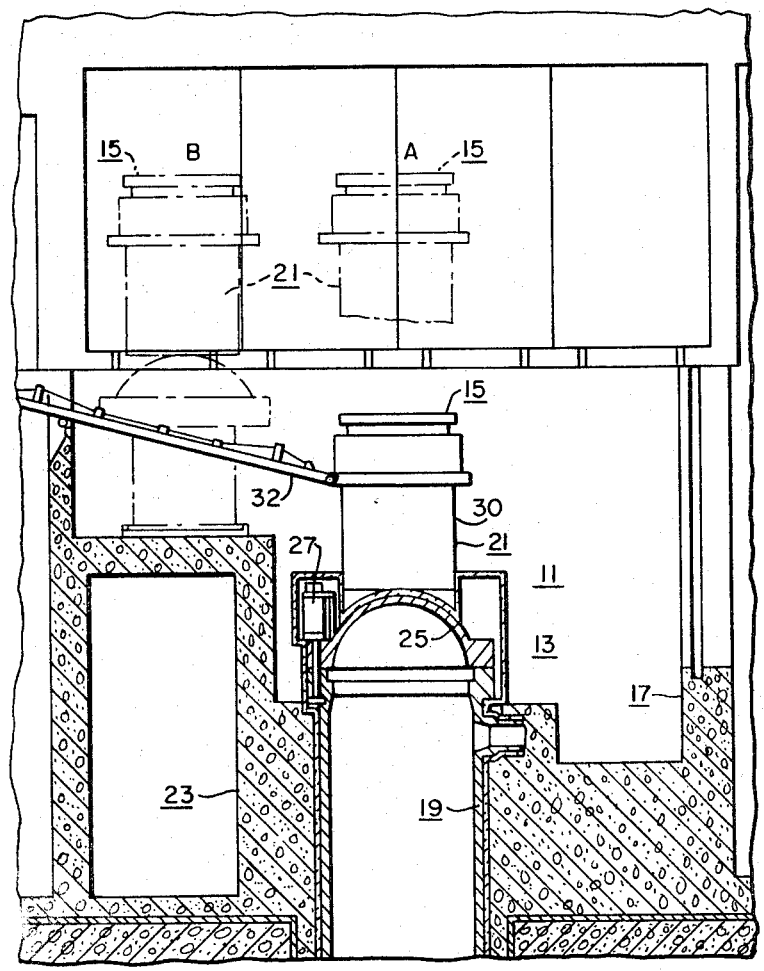
FIG. 1 is a view partly in section and partly in side elevation showing the reactor and shield combination of this invention.

The apparatus shown in the drawings includes the combination 11 of a nuclear reactor 13 and a missile shield 15. The reactor 13 is disposed in a pit 17.

The reactor 13 includes a lower package 19 and an upper package 21. The lower package 19 includes the reactor core (not shown), the lower part of the pressure vessel 23 and the lower internals (not shown) which generally comprises conventional components such as a lower core support plate, support ribs for the plate and a diffusor plate. The upper package 21 includes the upper internals (not shown) which generally comprises conventional components, such as an upper core plate, deep beam support structure and rods connecting the support structure with the core, the closure head 25 for the vessel 23, the bolt tensioning devices 27, the control rod mechanisms 29 and the missile shield 15. The enclosure 30 for the upper package 21 carries a cable tray 32 with the electrical cables for the reactor 13. During refueling the upper package 21 is lifted to the position A shown in broken lines in FIG. 1 and set to one side to the position B shown in FIG. 1.

Referring to FIG. 2, the control rod mechanism 29 includes a plurality of clusters 31 of pistons (not shown) of the type disclosed in application Ser. No. 53,201 and also in application Ser. No. 700,121 filed January 24, 1968 by Erling Frisch and Harry N. Andrews for Drive Mechanism for Control Element. As disclosed in these applications, each cluster 31 in a housing 33 having a closure plug 35 terminating in a cylindrical extension or projection 37. A holding electromagnet 39 is provided for each piston (not shown) of each cluster 31. This electromagnet holds the piston in the retracted position during normal operation of the reactor. During refueling the magnetizable core (not shown) of the electromagnet 39 is replaced by a permanent magnet core (not shown). In the position of the combination during normal operation each magnetizable core (not shown) is held in the corresponding magnet structure of the electromagnet 39 by a push rod 43 which is pressed downwardly by a spring-loaded button 45 mounted on the shield 15.

The missile shield 15 includes a heavy circular plate 51 (FIGS. 2, 3, 4, 5, 7) reinforced by deep vertical ribs 53 on the upper side. The shield 15 may be manufactured by welding of steel plates, or it may be produced by casting. The lower surfaces of the plate 51 should preferably be machined so that it is substantially flat. Lateral movement of the shield 15 during seismic distubance is prevented by a plurality of removable anchor or bracing rods 54 connected between connectors 56 on the periphery of the plate 51 and the walls of the reactor pit 17.

The missile shield 15 serves as the lifting rig for the upper package 21 and is located directly above the control rod mechanisms 29 and is supported on a plurality of lifting rods or bars 55 spaced substantially uniformly. The rods 55 are located around the periphery of the mechanism complex and are secured by threading to brackets 57 welded to the closure head 25. The upper ends of the rods 55 enter the shield plate 51 through holes with adequate clearance to permit the desired vertical movement of the shield 15. During normal reactor operation, the shield rests on shoulders 59 of the lifting rods 55. Raising of the shield is achieved by hydraulic cylinder 61, located directly under the shield 15 and supported on shoulders 63 of the lifting rods 55. When hydraulic pressure is applied through inlet 65 to the underside of annular pistons 67, the shield 51 is lifted until the surface of counter bores 69 contact washers 71 which are secured on the lifting rods 55 by nuts 73. The washers 71 are rectangular in shape with a lower cylindrical extension 75 as illustrated in FIG. 7. Rotation of the washer is prevented by guide plates 77 welded to the reinforcement ribs 53 on both sides of the washer 71.

Figure 5:
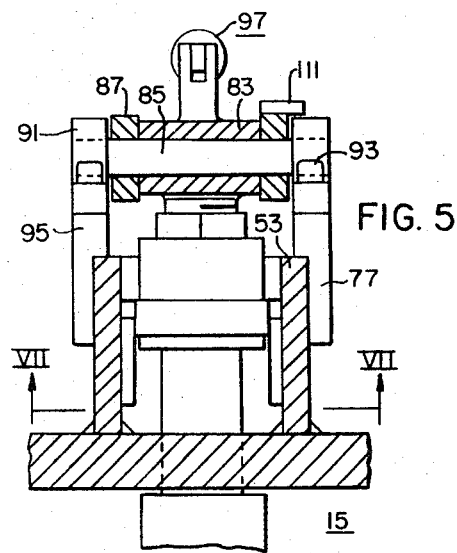
FIG. 5 is a view in section taken along line V—V of FIG. 2.

Accidental movement of the missile shield 51, when it is in either the lower or upper position, is prevented by latching devices 81 mounted above each lifting rod position FIGS. 4 and 5. Each latching device 81 includes toggle arms 83 each free to rotate on a shaft 85 supported in holes at the ends of a pair of spaced cross bars 87. The cross bars 87 in turn are mounted on a central shaft 89 supported at both ends in bearing blocks 91, FIG. 5. The bearing blocks 81 are attached by bolts 93 to the machined upper surface of support blocks 95 welded to the reinforcement ribs 53 on missile plate 51. A hydraulic actuator 97 is connected between the upper extensions of the toggle arms 83 and will, when pressurized through tube 98, cause spreading of the arms 83 to positions indicated by dash-and-dot lines 99. With the pressure removed, the arms are returned to the original position under the influence of a spring (not shown) in the actuator 97.

The upper package lifting rig is permanently attached to the missible shield 15 through lifting lugs 101, rods 103 and rod ends 105. The total load to be lifted is applied to the rig from the head closure 25, through the lifting rods 55 with nuts 73, and then through the shield 15 itself and the lifting lugs 101. To assure safe operation, before any lifting with the cane (not shown) the missile shield 15 is first raised to the upper position by the hydraulically actuated pistons 67.

With the missile shield 15 in the lower position, any but a slight upward movement is prevented by the lower hooks 107 of the toggle arms 83 contacting the under side of washer 71. Reference to FIGS. 2 and 4 will show that such movement is not possible because rods 55 are firmly anchored in brackets 57 welded to closure head 25 and are therefore permanently fixed in an immovable position on the closure head. Also, the latching device 81 arrangement is permanently fixed to reinforcement ribs 53 welded to missile plate 51. As pressure is applied to the underside of pistons 67, the pistons move vertically and their exposed ends contact the underside of missile plate 51 and tend to lift it off seat 69. However, the missile plate cannot move vertically since any force against the underside of the plate moves the upper surface of hooks 107 on toggle arms 83 more firmly into contact with the underside of washer 71 because the toggle arms move with the plate 51 to which they are attached.

Typical of such slight movement of the missile shield 15 might be caused by a major break in a control rod mechanism structure 29 and cannot be tolerated because it would cause changes in the holding magnets 39 and prevent movement of the control rod (not shown) into controlling relationship with the fuel. Conversely, when the missile shield 15 is in the raised position, as shown in FIG. 4, downward movement is prevented by the lower tips 109 of the toggle arms 83 contacting the upper surface of washer 71 which is immovable because its attached rod 55 is permanently anchored in bracket 57 on closure head 25. Such movement would, otherwise, occur should the lifting rig (not shown) be released from the crane hook after the upper package is brought to the stored position B, unless the hydraulic raising device is being pressurized continuously. This would cause repositioning of the mechanism holding magnets 39, resulting in possible release of one or more control rods.

To help assure equal loading on each toggle arm 83 in both positions of the missile shield 15, the cross bars 87 are permitted to rotate slightly on the central support shaft 89. Their rotation is limited by the distance between a lip 111 (FIG. 5), on one of the cross bars 87 and the upper surface of the associated bearing block 91, so as to insure that the toggle arms 83 can return to the latched position, after actuator operation, without interference with washer 71.

The projections 37 from the closure plugs 35 of the housings 33 of the control mechanism 29 penetrate the shield plate 51 in large clearance holes 113 to provide lateral support for the mechanisms 29 during seismic disturbances. The shield 15 itself is prevented from lateral movement by anchor rods 54 which connect the periphery of the shield 15 with the walls of the reactor pit 17. Shoulders 115 on the extensions, directly below the shields, are provided to permit only a limited vertical movement of a mechanism housing 33, when the missile shield 15 is in the lower position, should a major break occur.

The function of the missile shield 15 in modifying the holding magnets for refueling, disclosed in detail in application Ser. No. 53,201, is carried out through the spring-loaded buttons 45 (FIG. 6). These buttons 45 cooperate with the push rods 43 of the control mechanism 29. The push rods 43 are diametrically disposed with reference to the push ring 121 of each mechanism 29. Each button 45 is slideable in a hollow cylindrical housing 123 having a flange 125 bolted to the under flat face of the plate 51. The housing 123 also has a stem-like extension 127 which extends into a hole in the plate 51. The button 45 is carried by a pin 129 which extends through the extension 127 and has a nut 131 which prevents the pin 129 and button 45 from falling out of the extension. The button 45 and pin 129 are urged downwardly by a compression spring 133 so that, unless the spring 133 is counteracted, the nut 131 engages the upper end of the extension 127. With the shield 15 in the normal lower operating position the buttons 45 engage the cooperative push rods 43 setting the electromagnets 39 for electrically magnetizable holding. When the shield 15 is retracted during refueling the buttons 45 are disengaged from the push rods 43 setting the electromagnets 39 for permanent magnet holding.

To raise the missile shield 15 from the normal operating position to the refueling position the tube 98 of each actuator 97 is connected to a source of fluid causing toggle arms 83 to move to position 99 (FIG. 4). Hydraulic fluid is then conducted through tubes 65 to cylinders 61 raising pistons and the shield 15 to the position shown in FIG. 4. The fluid is then retracted from actuators 97 latching the shield 15 in the raised position as shown in FIG. 4. The fluid is then retracted from the cylinders 61.

After the refueling is completed and the upper package 21 is replaced on the reactor vessel 19, the shield 15 is lowered to its normal position. The recommended procedure for accomplishing this is first to apply pressure to the hydraulic raising devices 61–67. This frees the toggle arms 83 from contact with washers 71 and permits the arms 83 to be rotated to the released position by operating the hydraulic toggle actuators 97. By slowly reducing the pressure on the raising devices, the missile shield 15 now gradually settles until it comes to rest on the shoulders 59 of lifting rods 55. During the downward movement, the actuator buttons 45 contact the mechanism push rods 43 and force them to the lower limit, thereby causing the required modification of the holding magnets 39. Spring loading of the actuator buttons 45 is necessary to allow for some over travel without causing damage to the mechanism 29. When the missile shield is lifted, springs (not shown) in the mechanism 29 restore the magnet structures to the original conditions, required during refueling, and also lift the push rods 43.

To gain access to the control rod mechanism 29, for example for replacement of coils 39, the missile shield 15 must be removed. To accomplish this, it first is necessary to remove the lifting rod latching devices 81 by unbolting the bearing blocks 91 through which the devices are attached to the shield 15. After loosening and removing the main nuts 73, which now are accessible, the missile shield 15 may be lifted and stored. To protect the rod threads when lifting and again replacing the shield 15, the nuts 73 should be exchanged with speared bushings during these operations.

While preferred practice of this invention is disclosed herein many modifications thereof are feasible. This invention then is not to be restricted except as is necessitated by the spirit of the prior art.

We claim as our invention:

1. A nuclear reactor comprising:
    a pressure vessel containing a reactor core having fuel elements therein, a head attached in fluid-tight relationship with the vessel, control mechanisms surmounting the pressure vessel head and having means for moving control rods relative to the fuel elements in the core, a missile shield mounted above said head, and a rig on said shield to permit lifting the missile shield alone or the combination of the missile shield, head and components associated with the head, the improvement comprising:
    openings formed in said shield; and
    means on said control rod mechanisms extending into said openings to coact with the walls forming said openings and provide lateral support to said mechanism during seismic disturbances.

2. The combination according to claim 1 including brackets attached at spaced intervals to the peripheral surface of said shield, and
    anchor rods connected at one end to said brackets and adapted for connection at their other ends to walls of a pit in which the reactor is adapted to be positioned.

3. The combination according to claim 1, wherein bars are secured at one end on said head and fixed at their other ends in supporting relationship with said shield for holding the shield in a predetermined position above said head.

4. The combination according to claim 3, wherein a projection on said other end of said bars supports the shield in a fixed position.

5. The combination according to claim 1, wherein lifting means is secured on said head and fixed in contact with the shield positioned thereabove for raising the shield from a preset position.

6. The combination according to claim 5, wherein said lifting means includes bars secured at one end on said head and supporting said shield at their other ends;

a device on said bars having surfaces arranged to contact said shield; and means associated with said device for urging it and the thus supported shield upwardly from the shield preset position.

7. The combination according to claim 5, wherein said lifting means includes bars mounted on said head, a projection on the other end of said bars arranged to support said shield; and hydraulically actuated means supported on each bar including a piston having an end in contact with said shield for raising the shield from its supported position when the piston is acted upon by hydraulic pressure.

8. The combination according to claim 3, wherein an end of said bars extend through said shield; and clamping means on said shield designed to contact each of said bars to selectively restrain movement of said shield in a vertical direction.

9. The combination according to claim 6, wherein said bars extend through said shield;

clamping means attached to said shield; and said clamping means having arms movable into engagement with each of said bars to selectively preclude movement of said shield in a vertical direction.

10. The combination according to claim 9, wherein a member is attached to the upper end of each of said bars; and said clamping means comprises movably mounted cross bars, means pivotally mounting each of said arms on said cross bars, the arrangement being such that when the shield is in a lower in-use position said arms engage the underside of said member and restrict shield movement upwardly, and when the shield is in an upper out-of-use position, said arms engage the member upper surface to thereby preclude shield movement downwardly.

11. The combination according to claim 9 wherein said control rod mechanism includes plugs extending into the openings in the shield plate to provide lateral support for the mechanisms during seismic disturbances.

References Cited

UNITED STATES PATENTS

| | | | |
|---|---|---|---|
| 2,942,753 | 6/1960 | Kelton | 220—55.3 X |
| 3,212,979 | 10/1965 | Silverblatt | 176—36.5 |
| 3,243,353 | 3/1966 | Costes et al. | 176—87 |
| 3,578,564 | 5/1971 | Fletcher et al. | 176—38 |
| 3,563,855 | 2/1971 | Markd | 176—38 |

FOREIGN PATENTS

| | | | |
|---|---|---|---|
| 977,537 | 12/1964 | Great Britain | 176—87 |

REUBEN EPSTEIN, Primary Examiner

U.S. Cl. X.R.

176—87